United States Patent
Kehrer et al.

(10) Patent No.: US 12,015,866 B2
(45) Date of Patent: Jun. 18, 2024

(54) METHOD AND APPARATUS FOR EMULATING CAMERA OBJECTIVES

(71) Applicant: Arnold & Richter Cine Technik GmbH & Co. Betriebs KG, Munich (DE)

(72) Inventors: Klemens Kehrer, Vienna (AT); Matthias Pesch, Munich (DE); Michael Koppetz, Munich (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 229 days.

(21) Appl. No.: 17/118,931

(22) Filed: Dec. 11, 2020

(65) Prior Publication Data

US 2021/0185241 A1 Jun. 17, 2021

(30) Foreign Application Priority Data

Dec. 11, 2019 (DE) .......................... 102019134022.5

(51) Int. Cl.
*H04N 5/262* (2006.01)
*G06N 3/04* (2023.01)

(52) U.S. Cl.
CPC ............. *H04N 5/2621* (2013.01); *G06N 3/04* (2013.01)

(58) Field of Classification Search
CPC ............. H04N 5/2621; H04N 5/23229; H04N 17/002; G06N 3/04; G06N 3/0454; G06N 3/084; G03B 7/20; G03B 17/565; G03B 43/00; G03B 19/18
See application file for complete search history.

(56) References Cited

U.S. PATENT DOCUMENTS

| | | |
|---|---|---|
| 2015/0244930 A1 | 8/2015 | Ettinger et al. |
| 2017/0285307 A1* | 10/2017 | Kamm ................. H04N 5/2258 |
| 2018/0054556 A1* | 2/2018 | Hayasaka ............. H04N 23/00 |
| 2018/0212758 A1* | 7/2018 | Williams ................. H04L 9/14 |

(Continued)

FOREIGN PATENT DOCUMENTS

| | | | |
|---|---|---|---|
| JP | 2009253372 A | * | 10/2009 |
| JP | 2009253372 A | | 10/2009 |

(Continued)

OTHER PUBLICATIONS

German Communication dated Jun. 15, 2020 in connection with German Application No. 102019134022.5.

(Continued)

*Primary Examiner* — Sinh Tran
*Assistant Examiner* — Zhenzhen Wu
(74) *Attorney, Agent, or Firm* — Amster, Rothstein & Ebenstein LLP (57) ABSTRACT

The invention relates to a method for configuring an emulation method for emulating a second camera objective, comprising the steps: determining a plurality of first images that are recorded using a first camera objective; determining a plurality of second images that are recorded using the second camera objective and whose image content corresponds to the image content of the plurality of first images; and configuring the emulation method for emulating the second camera objective on the basis of the plurality of first images and the plurality of second images.

25 Claims, 6 Drawing Sheets

(56) References Cited

U.S. PATENT DOCUMENTS

| | | | | |
|---|---|---|---|---|
| 2018/0308281 A1* | 10/2018 | Okoyama | ............... | G06V 20/64 |
| 2019/0197731 A1* | 6/2019 | Potnis | .................... | H04N 7/183 |
| 2020/0111447 A1 | 4/2020 | Yaacob et al. | | |
| 2020/0193328 A1* | 6/2020 | Guestrin | ................. | G06T 7/194 |
| 2020/0356797 A1* | 11/2020 | Tsuchimoto | ....... | H04N 1/00029 |
| 2021/0150804 A1* | 5/2021 | Wick | .................... | G06T 15/205 |
| 2021/0183138 A1* | 6/2021 | Sauermann | ............. | G06T 13/00 |
| 2022/0152936 A1* | 5/2022 | Luan | ...................... | B33Y 30/00 |

FOREIGN PATENT DOCUMENTS

| | | | |
|---|---|---|---|
| JP | 2014225786 A | * | 12/2014 |
| JP | 2014225786 A | | 12/2014 |

OTHER PUBLICATIONS

Isola et al, "Image-to-Image Translation with Conditional Adversarial Networks," Berkeley AI Research (BAIR) Laboratory, UC Berkeley, Nov. 26, 2018, 17 pages.

Goodfellow et al, "Generative Adversarial Nets," Computer Science and Operations Research Department, Montreal University, Jun. 10, 2014, 9 pages.

Search Report dated Apr. 28, 2021 in connection with European Patent Application No. 20213083.7.

* cited by examiner

METHOD AND APPARATUS FOR EMULATING CAMERA OBJECTIVES

The invention relates to methods and apparatus for emulating camera objectives (camera lenses), in particular to methods and apparatus for adapting the imaging properties of a photographic objective and to methods and apparatus for configuring such methods and apparatus for adaptation.

An electronic motion picture camera typically comprises an integrated optical system (that is a camera objective or, for short: an objective or a lens) or a lens mount for mounting an interchangeable objective (interchangeable lens); further an electronic image sensor for generating image signals from incident light; and an image signal processing device for generating a digital image data stream from the image signals. The image data stream may include or be composed of a plurality of image data sets that may be designated as images for short.

In professional motion picture photography, cameras having interchangeable objectives are primarily used. The respective objectives, for example, differ in their focal length so that different recording situations may be considered due to the change. Objective series are further known in which the individual objectives are adapted to one another such that the image impression—for instance, the color reproduction or the resolution performance—also subjectively remains the same on a change between one focal length and the other.

It is also known that every real objective has physically induced limitations in the imaging performance. Depending on how the objective was calculated, designed and produced, visible imaging errors such as color errors, distortions or scattered light reflections occur more or less. On the one hand, an attempt is made to minimize these errors; on the other hand, minimal residual errors are also perceived as part of the imaging characteristic of an objective. These properties may also by all means be intentional in the sense of an aesthetic effect of the recorded image. The aesthetic effect in this respect also not only relates to the sharply imaged regions of the image, but the manner in which an objective represents blurred regions of the image may also contribute to the overall effect.

Up to now, objectives have mainly been optimized with respect to quantitatively measurable parameters such as contrast transfer (modulation transfer function, MTF), distortion, color aberration, etc. Simulation programs are known which may calculate these parameters for a predefined objective design on the basis of optical laws to support the optimization process in this way.

Specific information on the design of an objective may be used to improve the corrective image processing. In particular in the case of interchangeable objectives, it may be of advantage if the image processing can be individually adapted. For example, it is possible to store the relevant information in the respective objective and then to pass it on to the image processing software when the objective is connected to the camera. Furthermore, it is possible for the specific objective to be recognized by the image processing software and the information relevant for the correction to be taken from a corresponding database.

The camera objective used has a decisive influence on the effect of the images recorded by the motion picture camera (that is the subjective perception of an imaging characteristic of the objective, which may also be designated as the "look" of the objective).

Such a look may in particular result from a specific property and arrangement of the lenses used that may, for example, be characteristic of a certain objective manufacturer and/or of a certain time period. Such a characteristic appearance may be recognizable for the skilled person.

The users are always looking for new looks of objectives. The development of an objective with a specific look is very complex and/or expensive in this respect. The use of filters or the adjustment of individual optical parameters may only to a limited extent approximate the nuanced effects of the real objective that result in a specific look.

When it comes to achieving a very specific imaging characteristic in the design of an objective (for example, through the minimization of the residual errors, the adaptation to an existing objective, or the creation of a specific aesthetic impression), all the known methods rely on a modeling of the optical conditions on the basis of known physical laws.

To achieve an exact modeling of the imaging behavior, a very complex mathematical representation of the physical conditions is required. Effects such as scattered light or the representation of blurred regions may be extremely difficult to model since they depend on a large number of parameters.

For this reason, the implementation of an objective correction on the basis of a subsequent image processing is limited. In particular in the case of implementations that are to have an effect in real time or directly in a camera, the limits of the available processing power may be reached quickly. As a result, only simplified processing processes may be used that may in turn only emulate the desired optical effects to a limited extent.

Physical models of the objectives may therefore only describe the subjective properties of the objectives to a limited extent or would have to be so complex that they would not be usable in real time.

It is an object of the invention to provide methods and apparatus that enable the creation of images with an object-specific look without directly using the corresponding objective.

The object is satisfied by a method for configuring an emulation method for emulating a second camera objective having the features of claim 1, a method for emulating a second camera objective having the features of claim 15, a computer program product having the features of claim 23, and a motion picture camera having the features of claim 24. Advantageous embodiments of the methods, of the computer program product and of the motion picture camera are set forth in the dependent claims or result from the description or from the Figures.

Such a method for configuring an emulation method for emulating a second camera objective at least comprises the following steps: determining a plurality of first images that are recorded using a first camera objective; determining a plurality of second images that are recorded using the second camera objective and whose image content corresponds to the image content of the plurality of first images; and configuring the emulation method for emulating the second camera objective on the basis of the plurality of first images and the plurality of second images.

In other words, such a method configures an emulation method that emulates the look of the second image on the basis of an image recorded by means of a first objective (without changing the actual content of the recorded image, i.e. what is displayed on the recorded image). The method configures the emulation method on the basis of a plurality of first images, which are recorded by means of the first objective, and an associated plurality of second images, which are recorded by means of the second objective. In this respect, a second image is associated with each first image so that the first image and the associated second image have the same image content (but are recorded by different objectives).

An "emulation" of the second camera objective may in this respect be understood as a reproduction of what would be obtained as an image on the use of the second camera objective. The second camera objective may also be designated as the objective to be emulated. The result of the emulation may be designated as an emulated image.

As can be seen, first images and second images are provided to the method to configure (in other words: to train) an emulation method in this manner, namely by providing the first images as input to the emulation method and the outputs of the emulation method (that is the emulated images) being assessed by means of the second images. Ideally, the emulated images are similar or identical to the second images at least in terms of the image impression or the effect or the subjective impression (that is the look). The plurality of first images and the plurality of second images may be designated as a training data set. The training data set may include any desired real scenes or also transmitted light image templates. The training data set may include images in which image settings such as resolution, contrast range, color, or depth gradation are varied.

The emulation method may in this respect be configured iteratively, for example through feedback of an assessment of the emulated images. The feedback may comprise an assessment of the image impression or of the effect or of the subjective impression for similarity or identity between the first images and the second images.

The emulation method or an apparatus that performs the emulation method may also be designated as a generator. The method or an apparatus that is configured to assess the emulated images may be designated as a discriminator.

In accordance with an embodiment, the step of configuring the emulation method comprises determining parameters that represent the second camera objective. Different second camera objectives may therefore be represented by different parameters (or different parameter sets).

In accordance with an embodiment, the plurality of first images are recorded under predefined conditions and the plurality of second images are recorded under the predefined conditions, wherein the predefined conditions comprise at least one predefined lighting situation; and/or at least one predefined camera objective aperture setting; and/or at least one predefined camera objective focus setting; and/or at least one predefined camera objective focal length setting; and/or at least one camera sensor sensitivity setting; and/or at least one camera sensor white balance setting. Since the first images and the second images correspond to the same predefined conditions, such as the same aperture setting and the same focus setting of the objective used to generate the respective image, a particularly accurate configuration of the emulation method may take place.

Therefore, each of the first images has a corresponding second image recorded under the same conditions. These corresponding images make it possible to configure the emulation method. The emulation method is clearly configured such that the first images are processed such that they correspond to the second images, in particular with respect to the look. The emulation method configured in this manner may then also generate an emulated image (and thus emulate the second objective) for images which are recorded by the first objective and which are not included in the training data set, that is for which no corresponding image recorded by the second objective is available.

In accordance with an embodiment, the method comprises the step of generating the plurality of first images and the step of generating the plurality of second images, wherein the plurality of first images and the plurality of second images are simultaneously recorded, that is simultaneously in pairs, by two different image sensors.

In accordance with an embodiment, for the simultaneous recording of the plurality of first images and the plurality of second images, a respective image motif is imaged onto a first image sensor via a beam splitter (for example, a partly transmitting mirror) by the first camera objective and is simultaneously imaged onto a second image sensor (e.g. by transmission or by reflection) via the beam splitter by the second camera objective. Due to the beam splitter, the optical axes of the first objective and of the second objective may be mutually superimposed. The first image sensor and the second image sensor may in this respect be of the same type (that is identical in design) and/or may be configured identically so that differences between the first image and the second image are substantially solely due to the use of the first objective for the first image and of the second objective for the second image.

In a different embodiment, the plurality of first images and the plurality of second images may be recorded after one another by the same image sensor. This is in particular possible with static image content, that is with image content that does not change between the point in time at which a first image is recorded and the point in time at which the second image corresponding to the first image is recorded.

Alternatively, the first images and/or the second images may also be based on existing (e.g. historical) image material. In general, the first images and/or the second images may also be artificially generated or digitally post-processed.

In accordance with an embodiment, the plurality of second images and the corresponding templates or image motifs may be provided as a training data set that enables the plurality of first images to be generated spatially and temporally decoupled from the second images in order to configure an emulation method for emulating a second camera objective. A training data set may hereby be provided that may in particular correspond to a historical archive of images that were generated by means of the second camera objective. Due to such a training data set, the second camera objective is not directly required for configuring the emulation method. Provision may be made for the configuration of the emulation method that the plurality of first images are indeed generated by means of a different (first) camera objective, wherein, however, the same image sensor, an image sensor of the same kind, or an image sensor configured in the same manner as for the original generation of the plurality of second images is preferably used. The generation of the plurality of first images may take place on the basis of the templates of the training data set.

In accordance with an embodiment, the emulation method uses a first artificial neural network. In accordance with an embodiment, the first artificial neural network has a deconvolutional neural network. Such a deconvolutional neural network may include at least one deconvolutional layer. A deconvolutional neural network may also include a plurality of deconvolutional layers. A deconvolutional neural network may also include further layers (which are not deconvolutional layers) in addition to the at least one deconvolutional layer.

In this respect, artificial neural networks, in particular deconvolutional neural networks, of a predefined structure may be used, wherein parameters describe the link of the individual neurons within the artificial neural network.

The configuration of the emulation method, that is the configuration of the artificial neural network, may then include a determination of these parameters. The parameters may in particular be determined such that the emulated images (that is the images that the emulation method generates from the first images) coincide with the second images as well as possible.

In accordance with an embodiment, the emulation method may in particular be configured by optimizing a target function.

In accordance with an embodiment, the target function is based on the extent to which a respective first image (of the plurality of first images) differs from a corresponding second image (of the plurality of second images) after a processing by the emulation method. The difference between two images may in this respect be determined pixel by pixel (that is by picture elements), or pixel group by pixel group (that is by groups of a plurality of picture elements, in particular adjacent picture elements), or in another way. For example, in accordance with an embodiment, the target function may be based on the extent to which a respective first image, after a processing by the emulation method, creates the impression on an observer (who is human) of having been recorded by means of the second camera objective.

In accordance with an embodiment, instead of a human observer, a second artificial neural network may be used that is trained to recognize whether an image was recorded by means of the second camera objective or not. In accordance with an embodiment, the target function may therefore be based on a second artificial neural network (that may be an example of a discriminator). In accordance with an embodiment, the second artificial neural network has a convolutional neural network. Such a convolutional neural network may include at least one convolutional layer. A convolutional neural network may also include a plurality of convolutional layers. A convolutional neural network may also include further layers (that are not convolutional layers) in addition to the at least one convolutional layer.

In cooperation with the first artificial neural network, a competition may thus arise between the first artificial neural network and the second artificial neural network, wherein the first artificial neural network attempts to create the emulated image as indistinguishable as possible from an image recorded by means of the second objective, and wherein the second artificial neural network attempts to identify any image that was not recorded by means of the second objective (that is also any emulated image) as such an image. Thus, in accordance with an embodiment, the emulation method may be configured on the basis of a zero-sum game between the first artificial neural network and the second artificial neural network. The principles of a zero-sum game are known to the skilled person e.g. from game theory. The goal of the training of the first artificial neural network (that is of the emulation method) is that the first artificial neural network generates emulated images such that the second artificial neural network considers the emulated images as originating from the second objective.

In accordance with an embodiment, the method further comprises the step of alternately optimizing the first artificial neural network and the second artificial neural network.

Input data for the optimizations may in this respect be used a multiple of times (that is in a plurality of optimization steps, for example, both for the emulation method and for the method for configuring the emulation method).

Input data for the optimization of the generator (that is of the emulation method) may be first images that were recorded by means of the first objective and second images (of the same content) that were recorded by means of the second objective.

The input data for the optimization of the generator may also comprise historical images or historical film material that was recorded by means of a second objective that is no longer available. Since only the second objective may have been used in the creation of the old film material, it is necessary for the use of the method for configuring the emulation method to provide the corresponding images (or the corresponding film material) recorded by means of the first objective. This may, for example, take place by a manual processing so that the first images create the impression of having been recorded by means of the first objective.

Input data for the optimization of the discriminator (that is of an assessment unit) may be as follows:
images that were actually recorded by means of the second objective, together with the information that these images were recorded by means of the second objective (these images should be recognized by the discriminator as originating from the second objective—that is as recorded by means of the second objective);
emulated images that actually originate from the first objective, but that were emulated to the look of the second objective by means of the emulation method, together with the information that these images were not recorded by means of the second objective (these images should be recognized by the discriminator as not originating from the second objective); and
images that were recorded by means of the first objective, together with the information that these images were not recorded by means of the second objective (these images should be recognized by the discriminator as not originating from the second objective).

The invention also relates to a method for emulating a second camera objective, comprising the steps: determining an image recorded using a first camera objective; determining parameters that represent the second camera objective; and applying a processing rule to the determined image using the parameters in order to emulate the second camera objective.

In this sense, the parameters may be used by the emulation method to generate an image on the basis of the first image that was recorded by means of the first objective, said image having the same content as the first image, but having the look of the second objective. In this respect, by performing the described method for configuring the emulation method, different parameter sets may be prepared for different second camera objectives, wherein each parameter set represents one of the plurality of second camera objectives. Thus, starting from a first image, a plurality of different second camera objectives may be emulated (by selecting the corresponding parameter set).

The emulation method may have a fixed structure, i.e. it may include fixed rules on how the image is to be processed by means of the parameters in order to obtain the emulated image in this manner. In this respect, the parameters parameterize these rules.

The emulation method may be carried out in the camera (that is on-the-fly, that is substantially directly subsequent to the recording of the image by means of the real objective) or subsequently, i.e. after a storage of the image data sets and in particular at a location independent of the camera. For example, a plurality of images or one or more moving image sequences, which each comprise a plurality of images, may be recorded and stored by means of a first camera objective and emulated images or moving image sequences may then be produced on the basis of these images or moving image sequences.

In accordance with an embodiment of the emulation method, the processing rule has an artificial neural network, for example a deconvolutional neural network.

In accordance with an embodiment, the emulation method was configured in accordance with the configuration method as described above or in accordance with an embodiment described with respect thereto.

In accordance with an embodiment of the emulation method, the configuration of the method comprises determining the parameters. For example, the parameters may be stored in the motion picture camera or in a database and may be read out from the motion picture camera or the database. The database may also be stored on a decentralized server (for example in a cloud).

A plurality of sets of parameters may be stored in the database. Each set of parameters may represent a specific objective to be emulated. Each set of parameters may furthermore represent a specific first objective (as an actually used objective) by means of which the images on the basis of which the second objective is to be emulated, are recorded.

In accordance with an embodiment of the emulation method, the parameters are provided in encrypted form, wherein the step of determining the parameters comprises decrypting the parameters on the basis of a user key (which may also be designated as a usage key). The user key may indicate which of the plurality of parameter sets (that is for which of the plurality of objectives to be emulated and/or for which of the plurality of objectives actually used) the user may access. Different user authorizations may hereby be defined.

The user key may refer to the processed image, the first objective and/or the second objective as well as to the emulation method (in other words, to a transformation) with respect to a first objective and a second objective (that is with respect to a pair of objectives). The usage key may be limited in time.

In accordance with an embodiment of the emulation method, a plurality of parameter sets are provided that correspond to a plurality of different second camera objectives; and/or to a plurality of camera objective aperture settings; and/or to a plurality of different first camera objectives; and/or to a plurality of camera objective focus settings; and/or to a plurality of camera objective focal length settings; and/or to a plurality of camera sensor sensitivity settings; and/or to a plurality of camera sensor white balance settings, wherein the method further comprises the steps: selecting one of the second camera objectives; and/or one of the first camera objectives; and/or a camera objective aperture setting; and/or a camera objective focus setting; and/or a camera objective focal length setting;

and/or a camera sensor sensitivity setting; and/or a camera sensor white balance setting; determining a parameter set that includes parameters that represent the selected second camera objective; and/or the selected first camera objective; and/or the selected camera objective aperture setting; and/or the selected camera objective focus setting; and/or the selected camera objective focal length setting;

and/or the selected camera sensor sensitivity setting; and/or the selected camera sensor white balance setting; and applying the processing rule to the determined image using the parameters of the determined parameter set in order to emulate the second camera objective (that is to emulate the selected second camera objective using the first camera objective; and/or the selected camera objective aperture setting; and/or the selected camera objective focus setting; and/or the selected camera objective focal length setting; and/or the selected camera sensor sensitivity setting; and/or the selected camera sensor white balance setting).

For a pair of objectives (that is for a specific first objective and a specific second objective), there may be a plurality of parameter sets for the emulation method, for example for different settings of the objectives such as the focus or the iris aperture. On the use of the second objective, its settings may be detected and the data may be used to select a suitable parameter set for the transformation.

In this respect, the selection of one of the second camera objectives may take place due to a user input. The selection of the respective camera objective setting may take place due to a user input or may take place automatically (for example on the basis of an electronic identification, for example on the basis of metadata that were included in the image data sets (of the images that were recorded by means of the first objective), e.g. LDS (lens data system) data. The electronic identification may be forwarded on the recording of the first image in order to select the correct parameters for the emulation method.

If parameters (or parameter sets) are available for different first objectives, the selection of the parameters that are associated with the actually used first objective may then take place due to a user input or may take place automatically (for example, on the basis of metadata that are included in the image data sets (of the images that were recorded by means of the first objective), e.g. by means of LDS (lens data system) data that include information about the model of the first objective).

In accordance with an embodiment, for the determination of the image, the first camera objective images an image motif onto an image sensor and the image sensor generates corresponding image signals. Image data sets include the image signals in digital form and may also be processed further (e.g. in a linearized or logarithmized manner). Image data sets may additionally also include metadata, e.g. a time signal, a sound signal, and/or camera objective settings. The image data sets may also be designated as images for short.

The invention also relates to a computer program product comprising commands that, when executed by a computer, cause said computer to perform one of the above methods (configuration method, emulation method). In this connection, an electronic computing unit is to be considered as the computer.

The invention also relates to a motion picture camera that is configured to record a time sequence of frames and that has a control unit that is configured to process the frames in accordance with one of the above-described emulation methods, for example in real time.

The control unit may, for example, comprise one or more of the following devices: an integrated circuit (IC); a microprocessor; a central processing unit (CPU); a graphics processing unit (GPU); an application-specific integrated circuit (ASIC); or a field programmable gate array (FPGA). The control unit may be located within a housing of the camera. Alternatively, parts of the control unit may be located outside of a housing of the camera and/or form a separate computing device that is permanently or releasably connected to the camera.

In accordance with an embodiment, the control unit is configured to form an artificial neural network. The artificial neural network may be parameterized by the parameters, as described above in connection with the emulation method.

In accordance with an embodiment, the control unit has a decryption module that is configured to decrypt the parameters.

In accordance with an embodiment, the motion picture camera has a housing that accommodates an image sensor for generating image signals and that has an interchangeable lens mount to which the first camera objective is selectively fastenable. In this case, the parameters may represent not only the second camera objective (so that the emulation of different second camera objectives is possible), but also the first camera objective (so that the emulation of the second camera objective is possible on the basis of different first camera objectives). Clearly, parameters for different associations of first camera objectives (that is of the camera objective by which images are actually recorded) with second camera objectives (that is with the camera objective that is to be emulated) may therefore be provided.

In the methods in accordance with the invention, a transformation of an image cannot be based on the physical parameters of the second objective, but rather on the image impression. The necessity for a complex modeling on the basis of optical laws is thereby dispensed with. After the one-time effort of training, a less computationally intensive transformation may then be used to align the recordings (for example, the trained artificial neural network of the generator).

Furthermore, the necessity of physically describing the target characteristics is dispensed with. Very subjective imaging properties may thus also be detected.

The method also makes it possible to detect any desired new objectives, even if no detailed technical data are present.

The invention will be described in the following with reference to an embodiment and to the drawings.

Elements that are the same or of the same kind are marked by the same reference numerals in the drawings.

Figure 1:
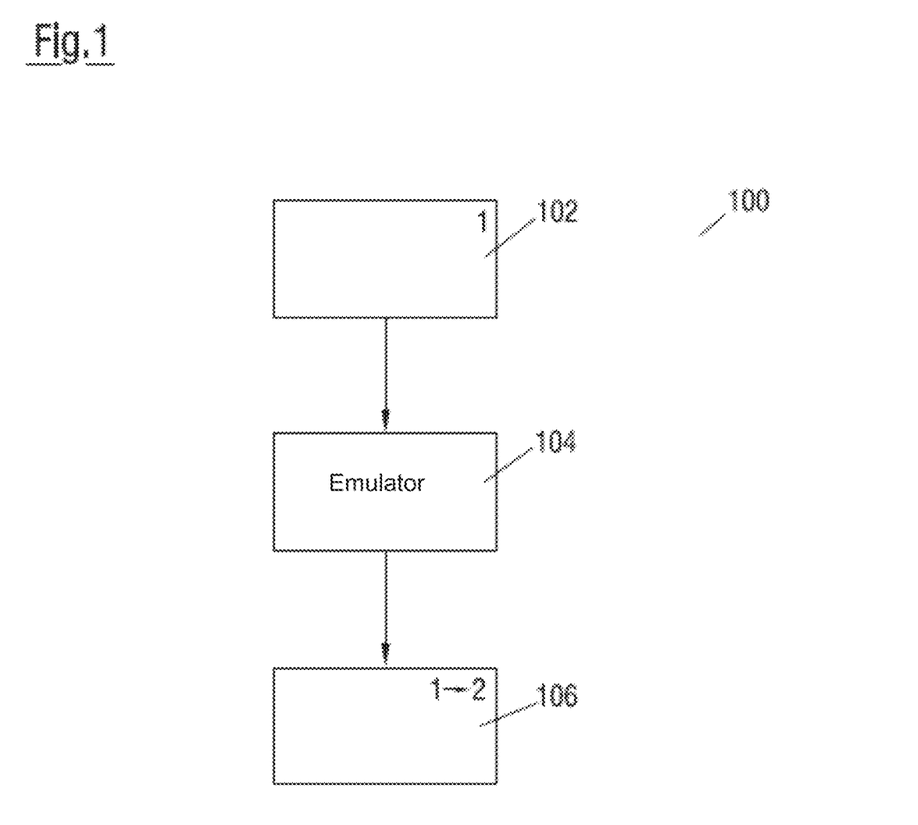
FIG. 1 shows a system with an emulator.

FIG. 1 shows, in a schematic representation, a system 100 with an emulator 104 that, starting from a first image 102 that was recorded by a first objective (in other words, using the first objective), produces an emulated image 106 that creates the impression on a human observer of having been recorded by a second objective (different from the first objective). The image content of the emulated image 106 is in this respect identical to the image content of the first image 102. However, the emulated image 106 differs from the first image 102 by the characteristic impression of the respective objectives.

In the images shown in the Figures, for a good legibility of the Figures, it is indicated in the upper right corner whether the image is an image (not processed by means of the emulation method) that was recorded by means of the first objective ("1" in the upper right corner), an image that was recorded by means of the second objective ("2" in the upper right corner), or an emulated image that was recorded by means of the first objective and that is intended to emulate the image impression of the second objective ("1→2" in the upper right corner).

The emulator 104 may be configured (in other words: set up; in other words: trained) by machine learning. For example, the emulator 104 may be an (artificial) neural network.

Figure 2:
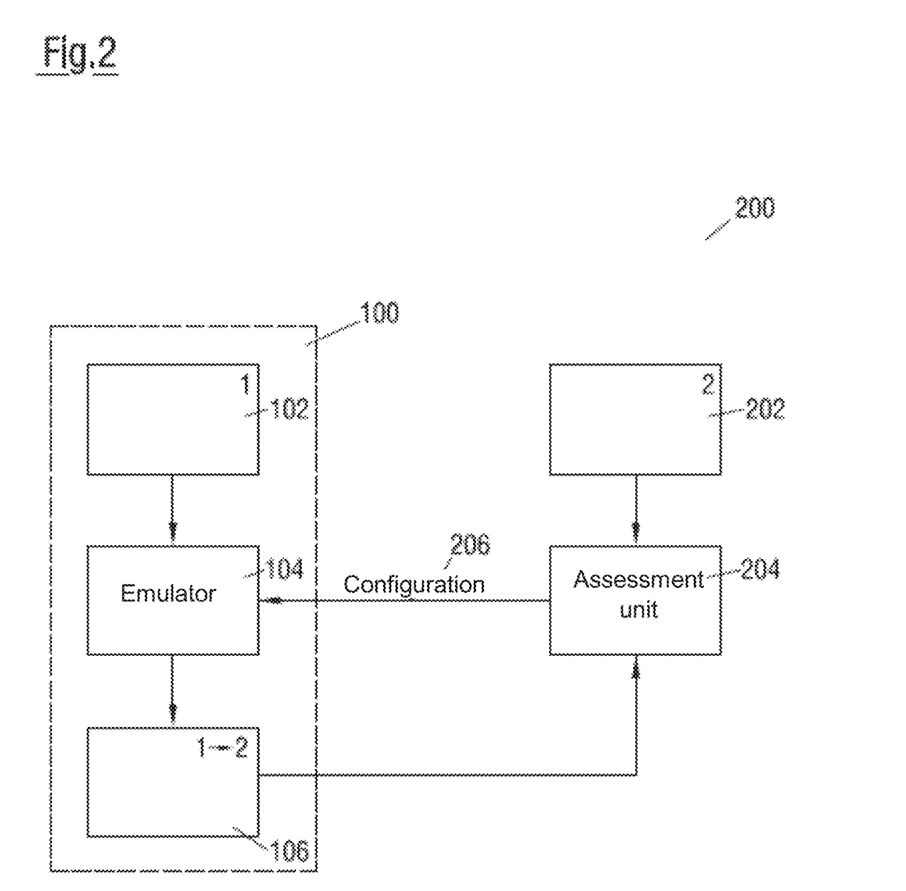
FIG. 2 shows a system for configuring an emulator.

FIG. 2 shows, in a schematic representation, a system 200 for configuring the emulator 104. For this purpose, a second image 202 that was recorded by the second objective may be provided, and indeed such that the second image 202 shows the same content (that is, for example, the same scene or the same motif) as the first image 102. The first image 102 and the second image 202 therefore only differ in that the first image 102 was recorded by the first objective, while the second image 202 was recorded by the second objective, for example as is described further below with reference to FIG. 3.

The emulated image 106, which represents an emulation of the second objective based on the first image 102 recorded by means of the first objective, may be compared with the second image 202, which was actually recorded by the second objective, using an assessment unit 204. The result of the comparison performed by the assessment unit 204 may be used to configure (as shown by the arrow 206) the emulator 104. During the configuration, parameters of the emulator 104 may be updated (for example, slightly adapted) on the basis of each pair of the first image 102 and the associated second image 202. The parameters of the emulator 104 may, for example, comprise links of individual neurons within an artificial neural network.

In an embodiment not shown in FIG. 2, the first image 102 and the second image 202 may be directly transferred to a configuration unit that configures the emulator 104 on the basis of the first image 102 and the second image 202. A direct comparison of the emulated image 106 with the second image 202 is then not absolutely necessary.

Even though only a respective one first image 102 and one second image 202 are shown in FIG. 2, a plurality of first images 102 and a plurality of second images 202 are typically necessary to configure the emulator 104, wherein one of the plurality of second images 202 is associated with each of the plurality of first images 102. The emulator 104 is therefore clearly configured on the basis of possible inputs in normal operation (that is on the first images 102) and on the desired outputs that the emulator 104 should generate in response to an input (that is the second images 202).

Figure 3:
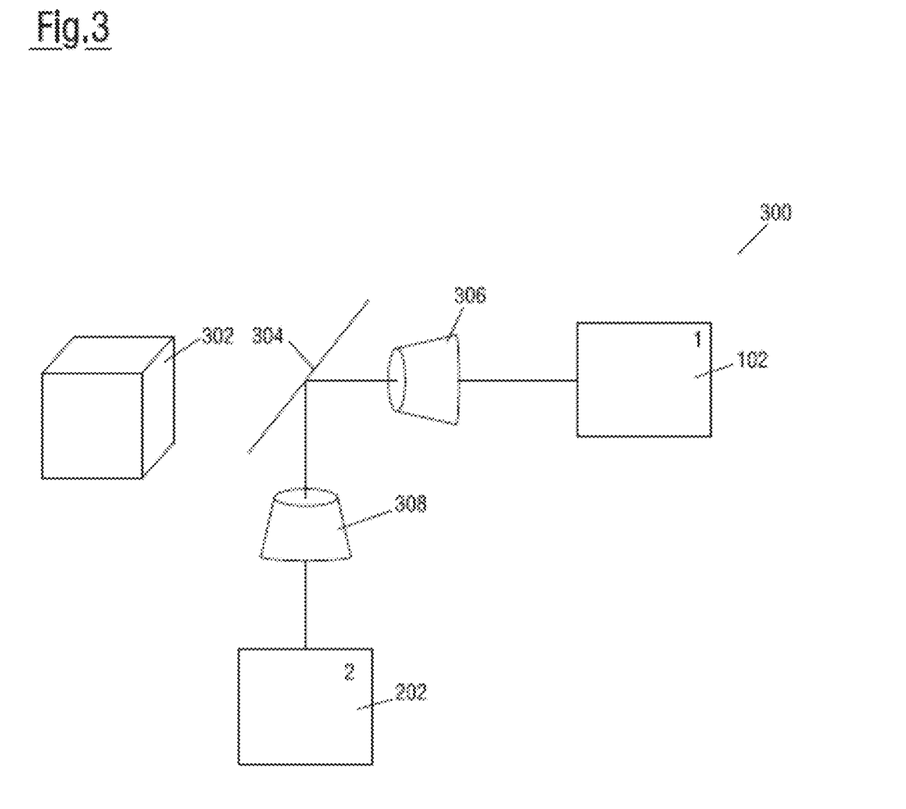
FIG. 3 shows a system for providing images by means of different objectives.

FIG. 3 shows, in a schematic representation, a system 300 for providing images 102, 202 by means of different objectives 306, 308. A template 302, which is to be the content of the recorded images 102, 202 and which may also be designated as an image motif, may be imaged by means of a beam splitter 304 and a first objective 306 to obtain the first image 102. The template 302 may further be imaged by means of the beam splitter 304 and a second objective 308 in order to obtain the second image 202. The first objective 306 and the second objective 308 may have the same focal length so that the template 302 is at least substantially identically represented in the first image 102 and in the second image 202 (in other words: so that the image content of the first image 102 at least substantially corresponds to the image content of the second image 202). The first image 102 and the second image 202 therefore only differ by the imaging characteristics (that is the look) of the objectives used (the first objective 306 and the second objective 308). To exclude or to minimize an influence of the image detection unit (that is, for example, of the image sensor and image (pre)processing possibly taking place in the camera)

on the images 102, 202, the first objective 306 and the second objective 308 may be operated at identical camera hardware (in particular with identical image sensors).

The use of the beam splitter 304 for generating the two images 102, 202 that (at least substantially) have the same contents enables the simultaneous generation of the images, which is in particular of advantage for moving contents 302. However, in particular with static contents 302, the second image 202 may also be recorded directly (that is without using the beam splitter 304) using the second objective 308, and after or before this, the first image 102 may be recorded using the first objective 306 (without using the beam splitter 304).

Figure 4:
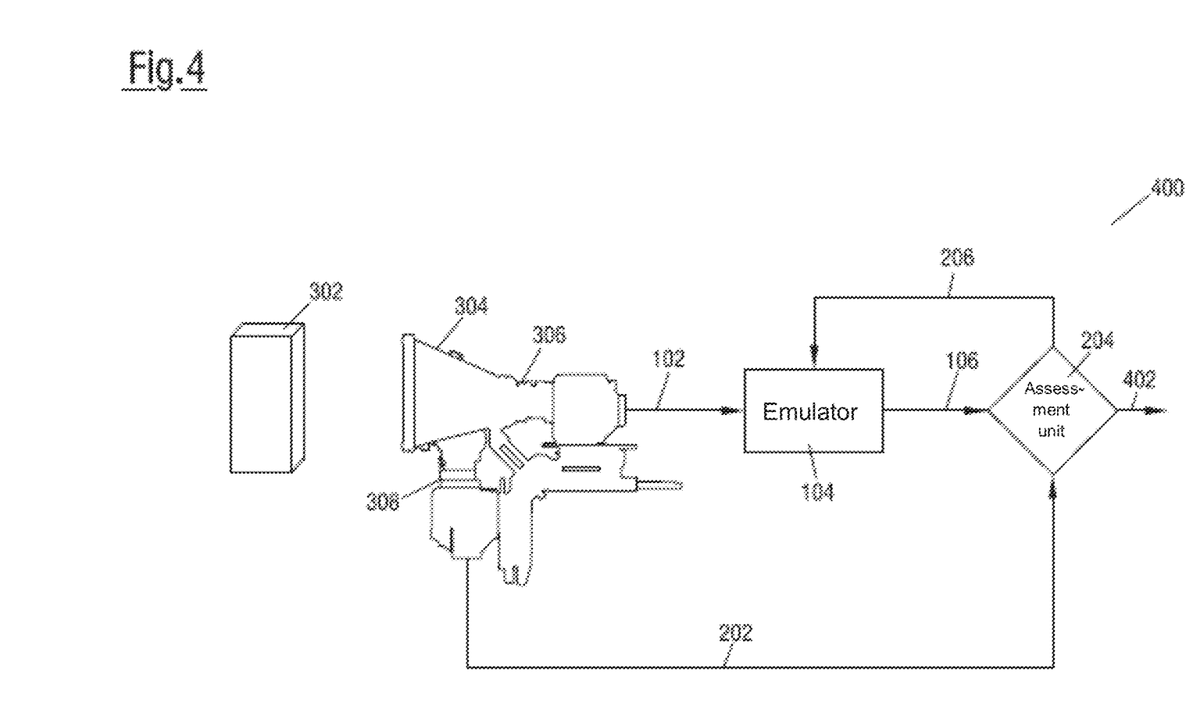
FIG. 4 shows a system for configuring an emulator.

FIG. 4 shows, in a schematic representation, a system 400 for configuring the emulator 104. As indicated by the arrow 402, the training goal for the emulator 104 is that an image that was recorded by means of the first objective 306 and that was transformed into an emulated image 106 by means of the emulator 104 cannot be distinguished from an image from the second objective 308. The training goal for the assessment unit 204 is to train it such that it can nevertheless distinguish an image that was recorded by means of the first objective 306 and that was transformed into an emulated image 106 by means of the emulator 104 from an image from the second objective 308.

With a (fixed or determined) first objective 306, a plurality of trainings may be performed by different second objectives 308 that then result in differently configured emulation methods (that is, for example, in different parameters or different parameter sets). It is then possible to store the different parameters (and to associate them with the (fixed or determined) first objective 306 and the respective second objective 308) and to use the one or another parameter set for the emulation method as required. It is thus possible to make the images from a first objective 306 appear like the images from the one or another second objective 308.

With a (fixed or determined) second objective 308, a plurality of trainings may be performed by different first objectives 306 that then result in differently configured emulation methods (that is, for example, in different parameters (or different parameter sets)). It is then possible to store the different parameters (and to associate them with the respective first objective 306 and with the (fixed or determined) second objective 308) and to use the one or another parameter set for the emulation method as required. It is thus possible to make the images from different first objectives 306 appear like an image from the second objective 308.

Figure 5:
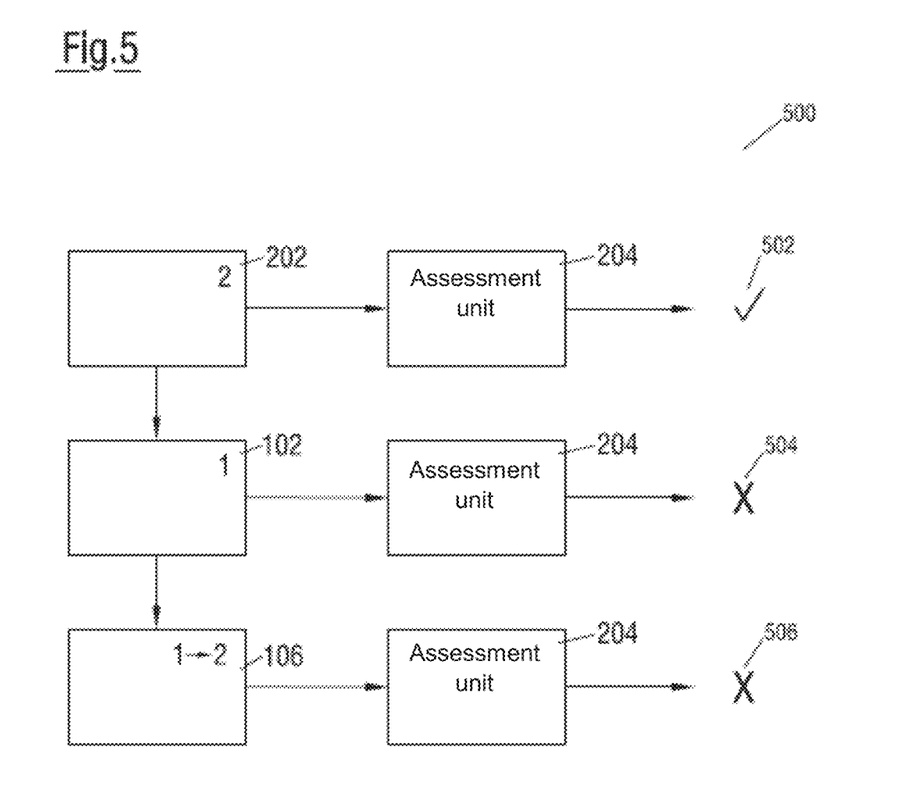
FIG. 5 illustrates a desired mode of operation of an assessment unit.

FIG. 5 shows an illustration 500 of the desired mode of operation of the assessment unit 204. The assessment unit 204 processes an image as input and outputs information on whether the image was recorded by means of the second objective or not. In the examples shown in FIG. 5, the assessment unit 204 outputs either "yes" (represented by a check mark) or "no" (represented by an X) as information on whether the image was recorded by means of the second objective or not. In general, however, instead of information that represents "yes" or "no" (in a binary manner), the information on whether the image was recorded by means of the second objective or not may also include information in the form of a probability (for example in percent, for example represented by a real or natural number between 0 and 1 or between 0% and 100% or by a "fuzzy" statement such as "very definitely yes", "probably yes", "no exact statement possible", "probably no", "very definitely no"). For example, the information on whether the image was recorded by means of the second objective may, for example, be indicated by a pixel-wise spacing from an image that was actually recorded by the second objective. Alternatively, the information on whether the image was recorded by means of the second objective may include information on how similar the effect of the image on a human observer is to an image that was actually recorded by the second objective.

On the input of the second image 202 recorded by means of the second objective, the information output by the assessment unit 204 on whether the second image 202 was recorded by means of the second objective or not should indicate that the second image 202 was recorded by means of the second objective, as represented by the check mark 502. On the input of the image 102 recorded by means of the first objective, the information output by the assessment unit 204 on whether the first image 102 was recorded by means of the second objective or not should indicate that the image 102 was not recorded by means of the second objective, as represented by an X 504. On the input of the image generated by the emulator 104 (that is the emulated image 106), the information output by the assessment unit 204 on whether the image 106 generated by the emulator 104 was recorded by means of the second objective or not should indicate that the image 106 generated by the emulator 104 was not recorded by means of the second objective, as represented by an X 506.

As described further above, the emulator 104 may be configured (in other words, trained). The assessment unit 204 may also be configured (in other words, trained). In this respect, the goal is to configure the emulator 104 such that it generates images that cannot be distinguished from images that were recorded by means of the second objective. The goal of the training of the assessment unit 204 is to configure it such that it can identify any image that was not recorded by means of the second objective. In this respect, the assessment unit 204 should also be able to identify images that were generated by means of the emulator 104 as not recorded by means of the second objective. The emulator 104 and the assessment unit 204 are therefore in competition with one another in this sense so that the configuration of the emulator 104 and the configuration of the assessment unit 204 may be designated as a zero-sum game. The "better" the emulator 104 is, the more difficult it is for the assessment unit 204 to identify an emulated image as not actually recorded by means of the second objective.

The assessment unit 204 may be configured (in other words: set up; in other words: trained) by machine learning. For example, the assessment unit 204 may be an (artificial) neural network.

Figure 6:
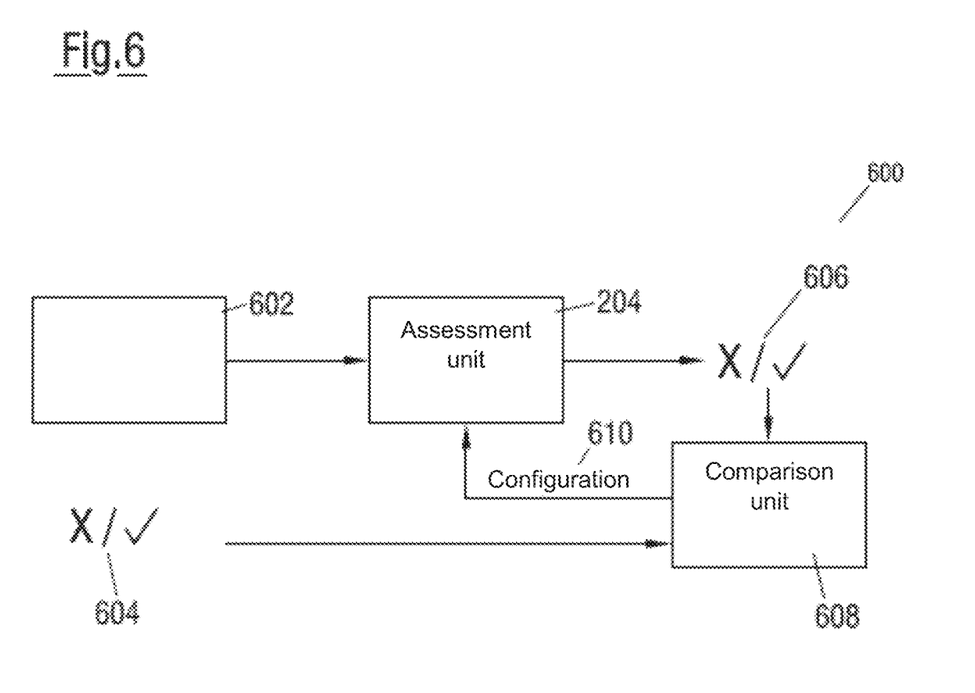
FIG. 6 shows a system for configuring an assessment unit.

FIG. 6 shows, in a schematic representation, a system 600 for configuring the assessment unit 204. Images 602 and associated information 604 on whether the respective image 602 was recorded by means of the second objective or not are provided as a data input for the configuration of the assessment unit 204. The quantity of the images 602 and of the associated information 604 may also be designated as a training data set.

Each image 602 is fed to the assessment unit 204 and the assessment unit 204 outputs information 606 on whether the image 602 (after an assessment by the assessment unit 204) was recorded by means of the second objective or not. In a comparison unit 608, the information 606 that was output by the assessment unit 204 is processed, for example compared, together with the information 604 that indicates whether the image 602 was actually recorded by means of the second objective or not, and the assessment unit 204 is configured on the basis of the processing, as represented by the arrow 610. In this respect, the configuration may comprise determining parameters which the assessment unit 204 uses. The parameters may be updated (for example, slightly adapted) on the basis of each image 602 to be processed and associated information 604, for example using a gradient method. The configuration may clearly comprise setting the parameters of the assessment unit 204 such that the input information 604 and the information 604 determined by the assessment unit 204 may coincide as well as possible for as many input images 602 as possible.

REFERENCE NUMERAL LIST

- 100 system with an emulator
- 102 first image
- 104 emulator
- 106 emulated image
- 200 system for configuring the emulator
- 202 second image
- 204 assessment unit
- 206 arrow that illustrates configuration
- 300 system for providing images
- 302 template
- 304 beam splitter
- 306 first objective
- 308 second objective
- 400 system for configuring the emulator
- 402 training goal for the assessment unit
- 500 illustration of the desired mode of operation of the assessment unit
- 502 check mark
- 504 X
- 506 X
- 600 system for configuring the assessment unit
- 602 images
- 604 information belonging to images
- 606 determined information on whether the image was recorded by means of
- the second objective or not
- 608 comparison unit
- 610 arrow that illustrates configuration

The invention claimed is:

1. A method for configuring an emulation method for emulating a second camera objective, comprising the steps:
   determining a plurality of first images that are recorded using a first camera objective;
   determining a plurality of second images that are recorded using the second camera objective and whose image content corresponds to the image content of the plurality of first images, the first camera objective and the second camera objective being non-identical with one another; and
   configuring the emulation method for emulating the second camera objective on the basis of the plurality of first images and the plurality of second images,
   wherein the method comprises the step of generating the plurality of first images and the step of generating the plurality of second images, wherein the plurality of first images and the plurality of second images are simultaneously recorded by two different image sensors that are of an identical type,
   wherein the plurality of first images are recorded under predefined conditions;
   wherein the plurality of second images are recorded under the predefined conditions;
   wherein the predefined conditions comprise at least one of:
   at least one predefined camera objective aperture setting;
   at least one predefined camera objective focus setting;
   at least one predefined camera objective focal length setting;
   at least one camera sensor sensitivity setting; or
   at least one camera sensor white balance setting.

2. A method in accordance with claim 1,
   wherein the step of configuring the emulation method comprises determining parameters that represent the second camera objective.

3. A method in accordance with claim 1,
   wherein the predefined conditions comprise
   at least one predefined lighting situation.

4. A method in accordance with claim 1,
   wherein, for the simultaneous recording of the plurality of first images and the plurality of second images, a respective image motif is imaged onto a first image sensor via a beam splitter by the first camera objective and is simultaneously imaged onto a second image sensor via the beam splitter by the second camera objective.

5. A method in accordance with claim 1,
   wherein the emulation method uses a first artificial neural network.

6. A method in accordance with claim 5,
   wherein the first artificial neural network has a deconvolutional neural network.

7. A method in accordance with claim 1,
   wherein the emulation method is configured by optimizing a target function.

8. A method in accordance with claim 7,
   wherein the target function is based on the extent to which a respective first image differs from a corresponding second image after a processing by the emulation method.

9. A method in accordance with claim 7,
   wherein the target function is based on the extent to which a respective first image, after a processing by the emulation method, creates the impression on an observer of having been recorded by means of the second camera objective.

10. A method in accordance with claim 7,
    wherein the target function is based on a second artificial neural network.

11. A method in accordance with claim 10,
    wherein the second artificial neural network has a convolutional neural network.

12. A method in accordance with claim 10,
    wherein the emulation method uses a first artificial neural network, and wherein the emulation method is configured on the basis of a zero-sum game between the first artificial neural network and the second artificial neural network.

13. A method in accordance with claim 10,
    wherein the emulation method uses a first artificial neural network, and wherein the method further comprises the step:
    alternately optimizing the first artificial neural network and the second artificial neural network.

14. A method for emulating a second camera objective, comprising the steps:
    determining an image recorded using a first camera objective;
    determining parameters that represent the second camera objective, the first camera objective and the second camera objective being non-identical with one another; and applying a processing rule to the determined image using the parameters in order to emulate the second camera objective,
wherein the method is performed in accordance with the method of claim 1.

15. A method in accordance with claim 14,
wherein the processing rule has an artificial neural network.

16. A method in accordance with claim 15,
wherein the artificial neural network has a deconvolutional neural network.

17. A method in accordance with claim 1,
wherein the configuration of the method comprises determining the parameters.

18. A method in accordance with claim 14,
wherein the parameters are provided in encrypted form, wherein the step of determining the parameters comprises decrypting the parameters on the basis of a user key.

19. A method in accordance with claim 14,
wherein a plurality of parameter sets are provided that correspond to at least one of:
 a plurality of different second camera objectives;
 a plurality of different first camera objectives;
 a plurality of camera objective aperture settings;
 a plurality of camera objective focus settings;
 a plurality of camera objective focal length settings;
 a plurality of camera sensor sensitivity settings; or
 a plurality of camera sensor white balance settings;
wherein the method further comprises the steps:
selecting at least one of:
 the second camera objectives;
 the first camera objectives;
 a camera objective aperture setting;
 a camera objective focus setting;
 a camera objective focal length setting;
 a camera sensor sensitivity setting; or
 a camera sensor white balance setting;
determining a parameter set that includes parameters that represent at least one of:
 the selected second camera objective;
 the selected first camera objective;
 the selected camera objective aperture setting;
 the selected camera objective focus setting;
 the selected camera objective focal length setting;
 the selected camera sensor sensitivity setting; or
 the selected camera sensor white balance setting; and
applying the processing rule to the recorded image using the parameters of the determined parameter set in order to emulate the second camera objective.

20. A method in accordance with claim 14,
wherein, for the determination of the image, the first camera objective images an image motif onto an image sensor and the image sensor generates corresponding image signals.

21. A computer program product embodied on non-transitory computer readable memory operatively connected to one or more processors, wherein the computer program product comprises commands that, when executed by the one or more processors, cause the one or more processors to perform the method in accordance with claim 1.

22. A motion picture camera that is configured to record a time sequence of frames and that has a control unit that is configured to process the frames in accordance with the method in accordance with claim 15.

23. A motion picture camera in accordance with claim 22, wherein the control unit is configured to form an artificial neural network.

24. A motion picture camera in accordance with claim 22, wherein the control unit has a decryption module that is configured to decrypt the parameters.

25. A motion picture camera in accordance with claim 22, wherein the motion picture camera has a housing that accommodates an image sensor for generating image signals and that has an interchangeable lens mount to which the first camera objective is selectively fastenable.

* * * * *